UNITED STATES PATENT OFFICE.

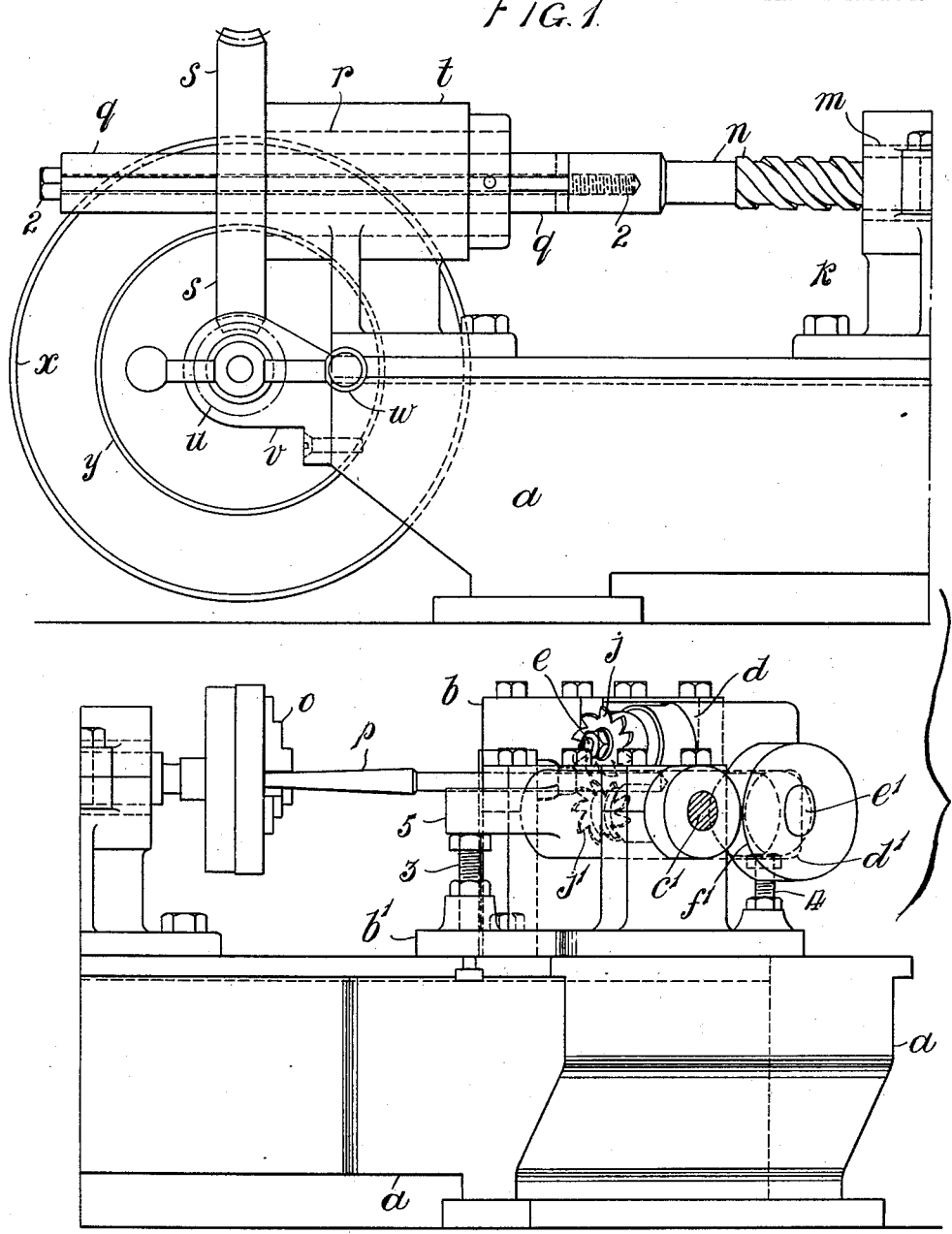

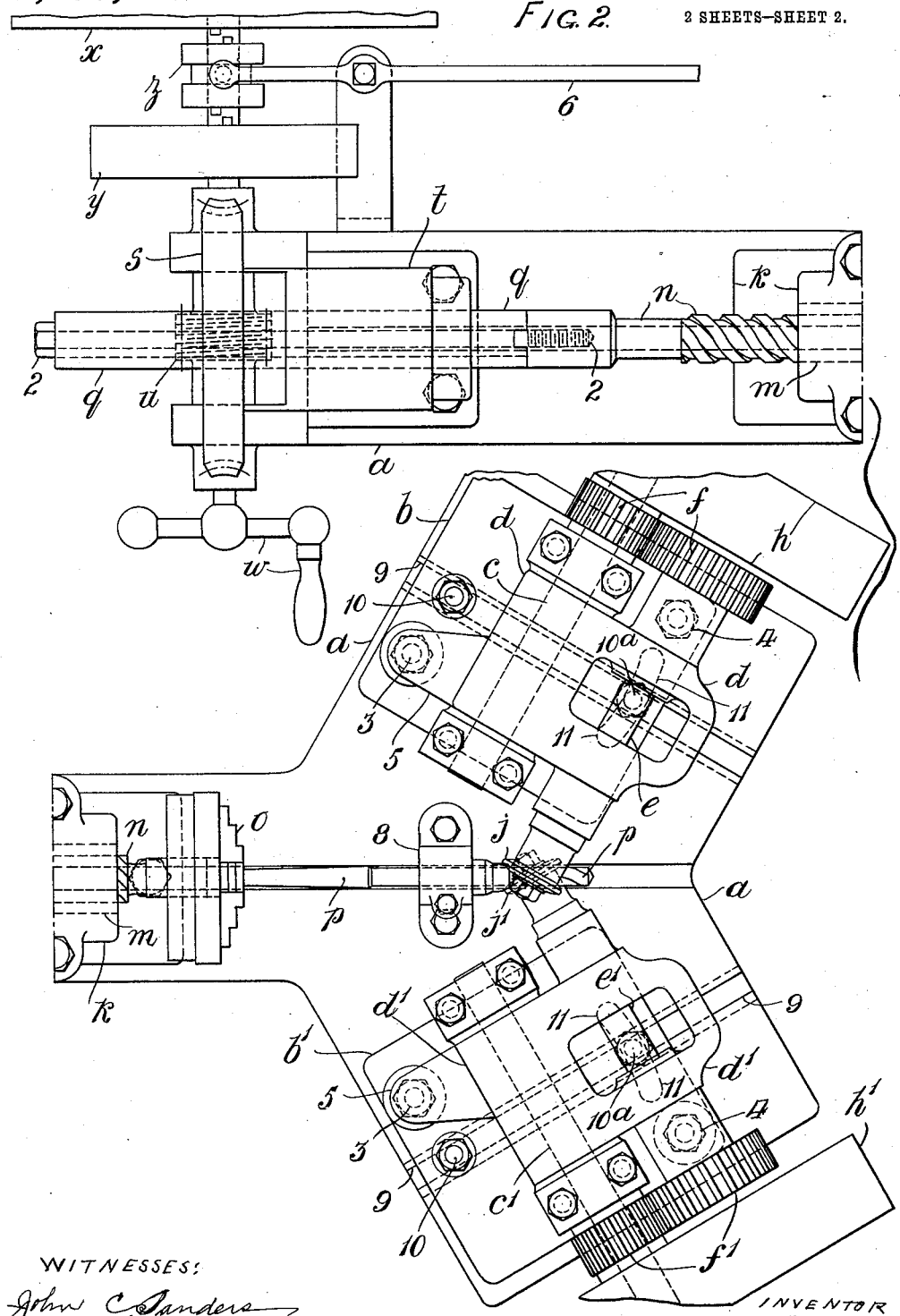

ISAAC BEST, OF MANCHESTER, ENGLAND.

APPARATUS FOR CUTTING THE GROOVES OF TWIST-DRILLS.

1,097,839. Specification of Letters Patent. Patented May 26, 1914.

Application filed January 30, 1914. Serial No. 815,424.

*To all whom it may concern:*

Be it known that I, ISAAC BEST, subject of the King of Great Britain and Ireland, residing at Culcheth Lane Tool Works, Newton Heath, Manchester, in the county of Lancaster, England, have invented new and useful Improvements in or Relating to Apparatus for Cutting the Grooves of Twist-Drills, of which the following is a specification.

This invention relates to apparatus for cutting the grooves of twist drills and has for its object to provide an improved apparatus of simple and efficient construction or arrangement, and also improved means of varying the depth of the grooves according to the diameter of the blank or drill.

I will fully describe the invention with reference to the accompanying drawings wherein—

Figure 1 is an elevation and Fig. 2 a plan of the preferred form of apparatus embodying the improvements.

Referring to the drawings, $a$ is a base or bed-plate on which are secured at one end two brackets $b$, $b'$. In suitable bearings in the brackets $b$, $b'$ are mounted driving shafts $c$, $c'$ and on the latter are mounted or pivoted angularly-adjustable brackets $d$, $d'$ in which are mounted cutter shafts $e$, $e'$. The cutter shafts $e$, $e'$ are geared to and driven by the driving shafts $c$, $c'$ by spur gearing $f$, $f'$. The driving shafts $c$, $c'$ are driven by pulleys $h$, $h'$ and belts or other suitable means. The cutter shaft $e$ carries a milling cutter $j$ and the shaft $e'$, which is arranged at a lower level than the shaft $c$, carries a similar cutter $j'$ which is situated immediately below the cutter $j$. On the base $a$ is also adjustably mounted a holder $k$ in which is removably mounted a nut $m$ with which co-acts a traversing or feed screw $n$, whose axis bisects the angle between the cutter shafts $e$ and $e'$. One end of the screw $n$ is fitted with a chuck $o$ for holding the blank $p$ to be grooved. The other end of the screw is detachably connected to a feed spindle $q$ which is splined in a sleeve $r$ carrying a worm wheel $s$ and mounted in a bracket $t$ on the base $a$. The worm wheel $s$ co-acts with a worm $u$ mounted in a bracket $y$ and adapted to be operated by hand by means of a handle $w$, or by power by suitably driven oppositely-rotating pulleys $x$ and $y$, loosely mounted on the spindle of the worm, and a clutch member $z$ splined thereon. The traversing or feed screw $n$ is attached to the feed spindle $q$ by means of a long set screw 2 passing through the spindle $q$ and screwing into the end of the screw $n$. The pitch of the traversing or feed screw $n$ and the nut $m$ corresponds to the pitch of the grooves to be cut in the blank $p$ and the brackets $b$, $b'$ are so arranged that the angles of the cutters $j$, $j'$ to the axis of the blank $p$ correspond to the pitch or the angles of the grooves thereto.

The brackets $d$, $d'$ are adapted to be rocked on the driving shafts $c$, $c'$ and are clamped in the desired position by set screws 3 and 4 screwing into the brackets $b$, $b'$, the screws 3 engaging below and co-acting with lugs 5 projecting from the brackets $d$, $d'$ at one side of the shafts $c$, $c'$, and the screws 4 engaging below and supporting the brackets $d$, $d'$ at the other side of the shafts $c$, $c'$.

On the rotation of the traversing or feed screw $n$ by the operation of the worm $u$, the blank $p$ is fed forward between the cutters $j$ and $j'$, and the latter cut grooves in the blank of a pitch corresponding to the pitch of the screw $n$ and the nut $m$, until the grooves are of the required length, when the rotation of the traversing or feed screw is reversed to withdraw the grooved blank. When the apparatus is operated by power the pulley $u$ is clutched by the clutch member $z$ to the worm $u$ to travel the blank toward and between the cutters and to withdraw the blank the pulley $x$ is released and the pulley $y$ is clutched to the worm spindle. The clutch member $z$ is operated by a lever 6 which may be actuated by hand or automatically.

The depth of the grooves cut in the blank $p$ by the cutters $j$, $j'$ may be varied as required by rocking or adjusting the brackets $d$, $d'$ on the shafts $c$, $c'$. Grooves of any pitch may be cut by removing the traversing or feed screw $n$ and nut $n'$, and substituting others of the required pitch or pitches and adjusting the angle of the cutters to the axis of the blank accordingly. For the latter purpose the brackets $b$, $b'$ are adapted to be adjusted both rectilinearly at an angle to the axis of the blank, and also angularly about axes at right angles to the axis of the blank. For the purpose of the rectilinear adjustment, straight adjusting slots 9 are provided in the base $a$ at an angle to the axis of the blank, and clamping bolts 10, 10ª are provided for clamping the brackets $b$, $b'$ in the desired adjusted position. For the angular adjustment of the brackets the latter are furnished with curved slots 11 so that they may be angularly adjusted on the clamping bolts 10.

By adjusting the brackets about the bolts 10 the cutters can be set to any desired angle according to the pitch of the screw $n$ and the grooves to be cut, and when adjusted as required, the cutters are "centered" on or with respect to the axis of the traversing or feed screw and the blank by adjusting the brackets along the slots 9. The width of the grooves cut by the cutters may be adjusted or increased by angularly adjusting the brackets $b$, $b'$, so that the angle of the cutters to the axis of the blank does not correspond to the pitch or angles of the grooves.

8 is a rest or steady for supporting the blank while it is being grooved and preventing vibration or chattering of the blank.

As will be obvious, one of the cutters and its adjuncts may be dispensed with and two grooves may be cut in the blank separately by a single cutter instead of being cut simultaneously by the two cutters.

Having thus described my invention, what I claim as new and desire to secure by Letters Patent is:—

In apparatus for cutting the grooves of twist drills the combination of a bed plate, a traversing or feed screw and a co-acting nut mounted on said bed-plate and of the same pitch as the required pitch of the grooves to be cut, means for connecting the blank to be grooved to said screw, means for rotating said screw and blank in either direction, a bracket mounted on said bed-plate and adapted to be adjusted thereon rectilinearly at an angle to the axis of said screw and blank, and also angularly about an axis at right angles to said axis, means for clamping said bracket in the required adjusted position, a driving shaft mounted in said bracket, a supporting-bracket adapted for angular adjustment about the axis of said shaft, means for clamping said supporting-bracket in the required adjusted position, a cutter-shaft mounted in said supporting-bracket and driven by said driving shaft, and a cutting tool on said cutter shaft.

In testimony whereof I have signed my name to this specification in the presence of two subscribing witnesses.

ISAAC BEST.

Witnesses:
   THOS. PRESCOTT,
   HAROLD WALKER.

---

Copies of this patent may be obtained for five cents each, by addressing the "Commissioner of Patents, Washington, D. C."